(12) United States Patent
Tanaka et al.

(10) Patent No.: US 6,249,152 B1
(45) Date of Patent: Jun. 19, 2001

(54) DATA STORAGE CONTROL CIRCUIT

(75) Inventors: Hiroyuki Tanaka; Mitsuya Ohie, both of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/392,786

(22) Filed: Sep. 9, 1999

(30) Foreign Application Priority Data

Sep. 11, 1998 (JP) .................................... 10-258362

(51) Int. Cl.[7] ...................................... H04L 7/00
(52) U.S. Cl. .............................. 327/34; 327/141
(58) Field of Search ...................... 327/34, 551, 552, 327/141, 154, 160

(56) References Cited

U.S. PATENT DOCUMENTS

| | | | |
|---|---|---|---|
| 5,136,382 | * 8/1992 | Meyer | 358/147 |
| 5,267,251 | * 11/1993 | Lenoir et al. | 714/812 |
| 6,118,284 | * 9/2000 | Ghoshal et al. | 324/750 |

* cited by examiner

Primary Examiner—Tuan T. Lam
(74) Attorney, Agent, or Firm—Rabin & Champagne, P.C.

(57) ABSTRACT

A shift register comprising a digital filter samples an input signal inputted from an external terminal based on a clock signal and inputs output signals a to d of the shift register constituting the results of the sampling to a gate circuit also comprising the digital filter. The voltage level of the output signal of the gate circuit makes a transition from an L level to an H level when at least three voltage levels of the output signals a to d are H levels. A sense circuit then detects changes in the voltage level of the gate circuit and outputs a signal instructing for the data outputted from the counter to be stored in the register.

21 Claims, 3 Drawing Sheets

DATA STORAGE CONTROL CIRCUIT

BACKGROUND OF THE INVENTION

1. Field of the Invention

The present invention relates to a data storage control circuit for controlling a so-called capture function where a counter is built into a microcomputer or a microprocessor and data of the counter (count information) is stored in a register based on arrival of an input signal from the outside.

2. Description of the Related Art

Microcomputers and microprocessors include data storage means (for example, read/write memory) for storing various data and central processing units (hereinafter referred to as "CPUs") for controlling operation of these data storage means and controlling arithmetic processing etc. of this data, and instruction execution means etc.

Execution of operations with respect to the CPU is carried out by instruction execution means. Instruction execution means consist of program memory for storing instructions to be executed, address counters for reading desired instructions from program memory and instruction decoders etc. for decoding instructions that are read out. Reading of instructions and decoding are carried out based on a clock signal having a prescribed clock period.

Microcomputers and microprocessors process data by executing instructions in a prescribed order based on the clock signal. Input signals are therefore inputted from an external terminal in a manner that is asynchronous with the operation of the microcomputer or microprocessor in order to carry out interrupt process requests etc. and it is therefore necessary to confirm the timing of the arrival of this input signal in a reliable manner. Microcomputers and microprocessors are therefore provided with a capture function for this purpose.

A capture function is a function for storing the output of a counter counting the clock signal in a prescribed register in accordance with the arrival of the input signal (i.e. the arrival of an edge of the input signal that is the timing of a change in the voltage level of the input signal) inputted from the external terminal.

The timing of the arrival of the input signal inputted from the external terminal can therefore be accurately known by confirming the contents stored in the register (the count value of the counter).

As the capture function operates in response to the arrival of the input signal inputted from the external terminal, when noise occurs in the input signal the contents of the counter become stored in the register in response to changes in the voltage level due to this noise. In these cases, the timing of the arrival of the input signal from the external terminal cannot be accurately confirmed.

Typically, a method where an analog filter is provided and a capture function is executed based on an input signal from the external terminal that passes via the filter has been considered as a method of removing signal noise.

When an analog filter is used, small amounts of noise of a few nanoseconds can easily be eliminated but an analog filter structure with a resistor element having a large resistance and a capacitor having a large capacitance is required for large amounts of noise of a few microseconds or more. It then becomes difficult to confirm the arrival of the input signal in an accurate manner because of increases in the circuit surface area for the analog filter and increases in cost, together with signal delays due to increases in the resistance of the resistor and increases in the capacitance of the capacitor.

It is therefore the object of the present invention to provided a data storage control circuit capable of exerting control in such a manner as to ensure accurate execution of a capture function even if noise occurs in an input signal subjected to monitoring.

It is a further object of the present invention to provide a data storage control circuit capable of dramatically reducing increases in circuit surface area and costs and capable of exerting control in such a manner as to achieve reliable confirmation of the arrival of an input signal.

SUMMARY OF THE INVENTION

In order to achieve the aforementioned objects, in the present invention, there is provided a data storage control circuit for storing data outputted from a counter circuit in a storage circuit based on changes in a logic level of an input signal, said data storage control circuit comprising a digital filter for sampling the input signal and outputting a control signal for changing a logic level based on the logic level of the input signal sampled a plurality of times and a sense circuit for sensing changes in a logic level of the control signal and controlling storage of data outputted from the counter circuit to the storage circuit.

Further, the digital filter of the present invention samples the voltage level of the input signal upon every transition from a first logic level to a second logic level of a sampling clock signal and stores data outputted from the count circuit in the storage circuit when the same logic level is sampled for the input signal m times (where m is a positive integer of two or more).

DETAILED DESCRIPTION OF THE PREFERRED EMBODIMENTS

Figure 1:
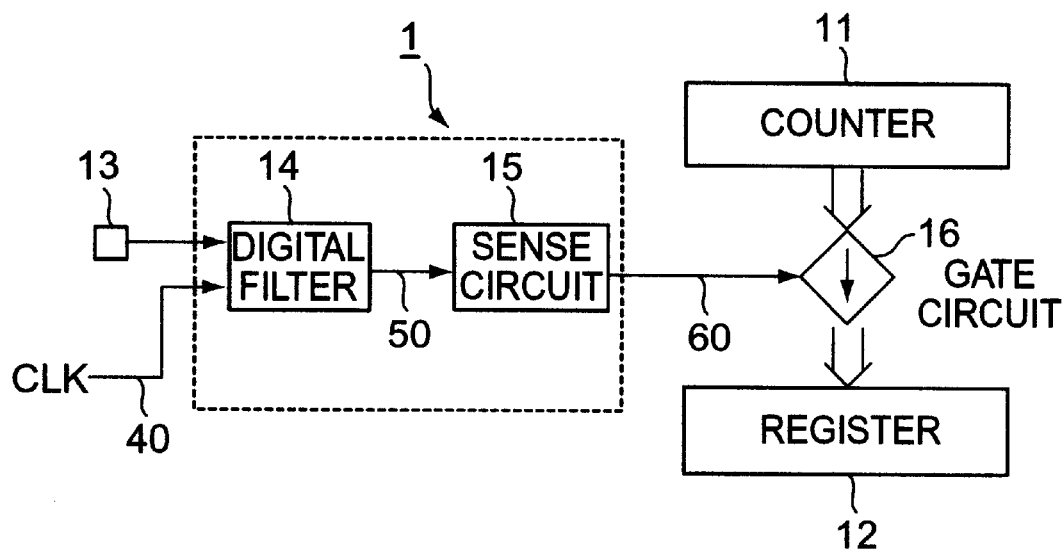
FIG. 1 is a block circuit diagram of the data storage control circuit and the peripheral circuits of a first embodiment of the present invention.

The following is a description using the drawings of a data storage control circuit of the present invention. FIG. 1 is a block circuit diagram of a data storage control circuit 1 constituting a first embodiment of the present invention and peripheral circuits of the data storage control circuit 1. The data storage control circuit 1 and the peripheral circuits are built into a microcomputer or a microprocessor.

In FIG. 1, an external input signal inputted via an external terminal 13 and a clock signal CLK transmitted via wiring 40 as a sampling clock are inputted to the data storage control circuit 1. The output signal of the data storage control circuit 1 is sent via wiring 60 to a gate circuit 16 that is one of the peripheral circuits.

Numeral 11 indicates a counter constituted by a count circuit that is one of the peripheral circuits, and numeral 12 indicates a register constituted by a storage circuit that is one of the peripheral circuits. The counter 11 counts, for example, the number of clocks of a clock signal CLK, with the count number being outputted as output data. The register 12 is for storing data outputted by the counter 11 via the gate circuit 16.

The data storage control circuit 1 monitors the presence of changes in the logic level (voltage level) of the input signal inputted via the external terminal 13 on either the rising edge (the time where the voltage level of the clock signal changes from a low voltage level to a high voltage level) or the falling edge (the time where the voltage level of the clock signal changes from a high voltage level to a low voltage level) of the clock signal CLK.

When the data storage control circuit 1 determines that the voltage level of the input signal being monitored has changed, the voltage level of the output signal transmitted from the wiring 60 is changed from, for example, a low voltage level (hereinafter referred to as "L" level) to a high voltage level (hereinafter referred to as "H level"). The output signal of the data storage control circuit 1 is preferably held at an H level long enough to store the output data of the counter 11 in the register 12.

The gate circuit 16 enters a state where data outputted from the counter 11 can be transferred to the register 12 in response to the voltage level of the output signal of the data storage control circuit 1 going from an L level to an H level. As a result, the register 12 stores data corresponding to the output data of the counter 11.

In other words, the gate circuit 16 is comprised of a plurality of AND gates of a number corresponding to the number of bits of data outputted from the counter 11. Each output of the data storage control circuit 1 is inputted to one input of each of the AND gates of the gate circuit 16 and single bit portions corresponding to the output data of the counter 11 are each respectively inputted to the remaining inputs of the AND gates of the gate circuit 16. The gate circuit 16 is comprised of a plurality of D-type flip-flops. The output signal of the data storage control circuit 1 maybe inputted to each clock terminal of these flip-flops and single bit portions corresponding to the output data of the counter 11 may be inputted to each of the data terminals. In the former case, the circuit configuration is simple, while in the latter case, the output data of the counter 11 can be temporarily stored.

The data storage control circuit 1 may change the voltage level of the output signal from a H level to an L level when it is determined that the voltage level of the input signal being monitored has changed. In this case, it is preferable for the gate circuit 16 to enter a state where transfer is possible in response to the voltage level of the output signal of the data storage control circuit 1 going from an H level to an L level.

The register 12 can usually be in a state where storage is possible but it is preferable for the register 12 to be able to enter a state where storage is possible when the voltage level of the data storage control circuit 1 becomes an H level. The desired data can therefore be stored for a longer time in the latter case and a reduction in power consumption is anticipated by the extent to which the operation of the register 12 can be suspended.

The data storage control circuit 1 comprises a digital filter 14 and a sense circuit 15. The digital filter 14 samples the input signal from the external terminal 13 in response to the rising or falling edge (this embodiment describes an example for the case of a falling edge) of the clock signal CLK. Noise occurring in the input signal can then be ignored by using the results of this sampling. The details of this are described in the following. As a result of the sampling, the voltage level of the control signal constituted by the output signal of the digital filter 14 transmitted via the wiring 50 is changed when the digital filter 14 senses the arrival of the input signal (i.e. senses that the voltage level of the input signal has changed).

The voltage level of the output signal of the sense circuit 15 transmitted via the wiring 60 is temporarily put to an H level when the sense circuit 15 senses a change in the voltage level of the control signal sent via the wiring 50 (i.e. when a rising edge or a falling edge of the voltage level of the control signal is sensed). The signal sent via the wiring 60 becomes the output signal of the data storage control circuit 1.

Figure 2:
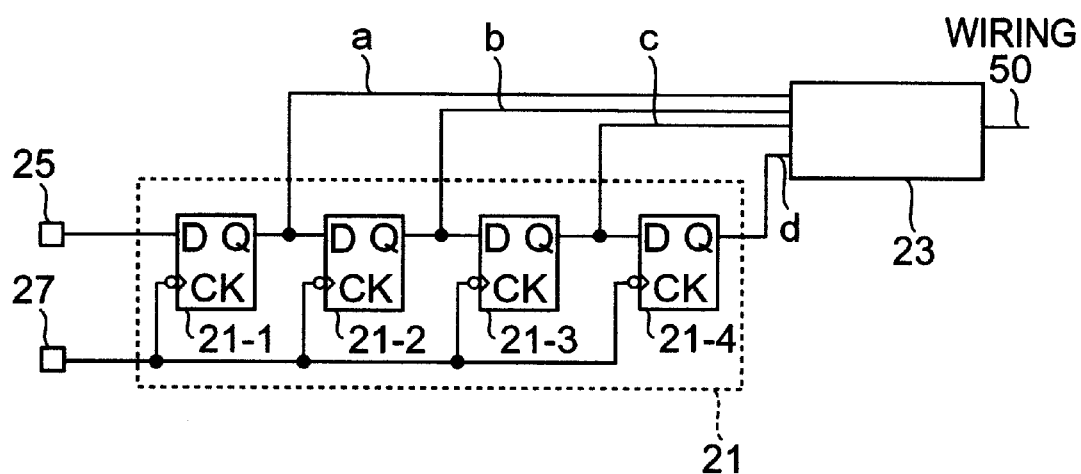
FIG. 2 is a circuit diagram of the digital filter of FIG. 1.

A description is now given using the drawings of a specific circuit configuration for the digital filter 14. FIG. 2 is a circuit diagram of the digital filter 14.

In FIG. 2, the digital filter 14 is comprised of a shift register 21 and a gate circuit 23 that is a control circuit.

In FIG. 2, the shift register 21 is comprised of four D-type flip-flops 21-1 to 21-4. An inverted signal of the clock signal CLK is inputted to the clock terminal CK of each flip-flop via a terminal 27. An input signal from the external terminal 13 is inputted to the data terminal D of the flip-flop 21-1. An output terminal Q of the flip-flop 21-1 is connected to a date terminal D of the flip-flop 21-2. An output terminal Q of the flip-flop 21-2 is connected to a data terminal D of the flip-flop 21-3. An output terminal Q of the flip-flop 21-3 is connected to a data terminal D of the flip-flop 21-4. Signals a to d outputted from the output terminal Q of the flip-flops 21-1 to 21-4 are respectively input to the gate circuit 23.

The shift register 21 is a four-bit shift register for storing and then outputting data in response to the voltage level of the input signal from the external terminal 13 every falling edge of the clock signal CLK, i.e. the shift register 21 samples the input signal and outputs information for the most recent four samples.

Figure 3:
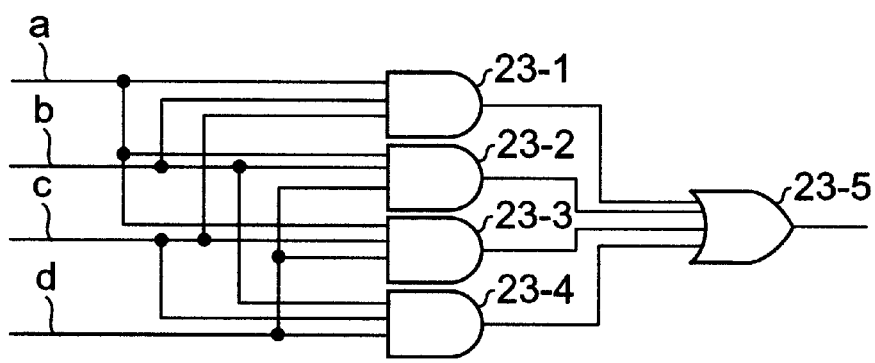
FIG. 3 is a circuit diagram of a gate circuit of FIG. 2.

FIG. 3 shows a specific circuit diagram of the gate circuit 23. The gate circuit 23 comprises four three input/one output AND gates 23-1 to 23-4 and one four input/one output OR gate 23-5.

Signals a, b and c that are the outputs of the flip-flops 21-1, 21-2 and 21-3 are inputted to the AND gate 23-1. Signals a, b and d that are the outputs of the flip-flops 21-1, 21-2 and 21-4 are inputted to the AND gate 23-2. Signals a, c and d that are the outputs of the flip-flops 21-1, 21-3 and 21-4 are inputted to the AND gate 23-3. Signals b, c and d that are the outputs of the flip-flops 21-2, 21-3 and 21-4 are inputted to the AND gate 23-4. Output signals of each of the AND gates 23-1 to 23-4 are inputted to the OR gate 23-5. An output signal of the OR gate 23-5 is a control signal, i.e. an output signal of the digital filter 14.

When at least three of the four most recent samples that are the four output signals of the shift register 21 are of an H level, the gate circuit 23 configured in this manner changes the output signal voltage level of one of the AND gates 23-1 to 23-4 from an L level to an H level. The voltage level of the output signal of the OR gate 23-5 therefore goes from an L level to an H level in response to the voltage level of the output signal of at least one of the AND gates 21-1 to 23-4 becoming an H level.

Therefore, with regards to the whole of the digital filter 14, the input signal from the external terminal 13 is sampled in response to the falling edge of the clock signal CLK and the voltage level of the control signal is put to an H level when information for at least three of the four most recent samples is an H level signal.

Figure 4:
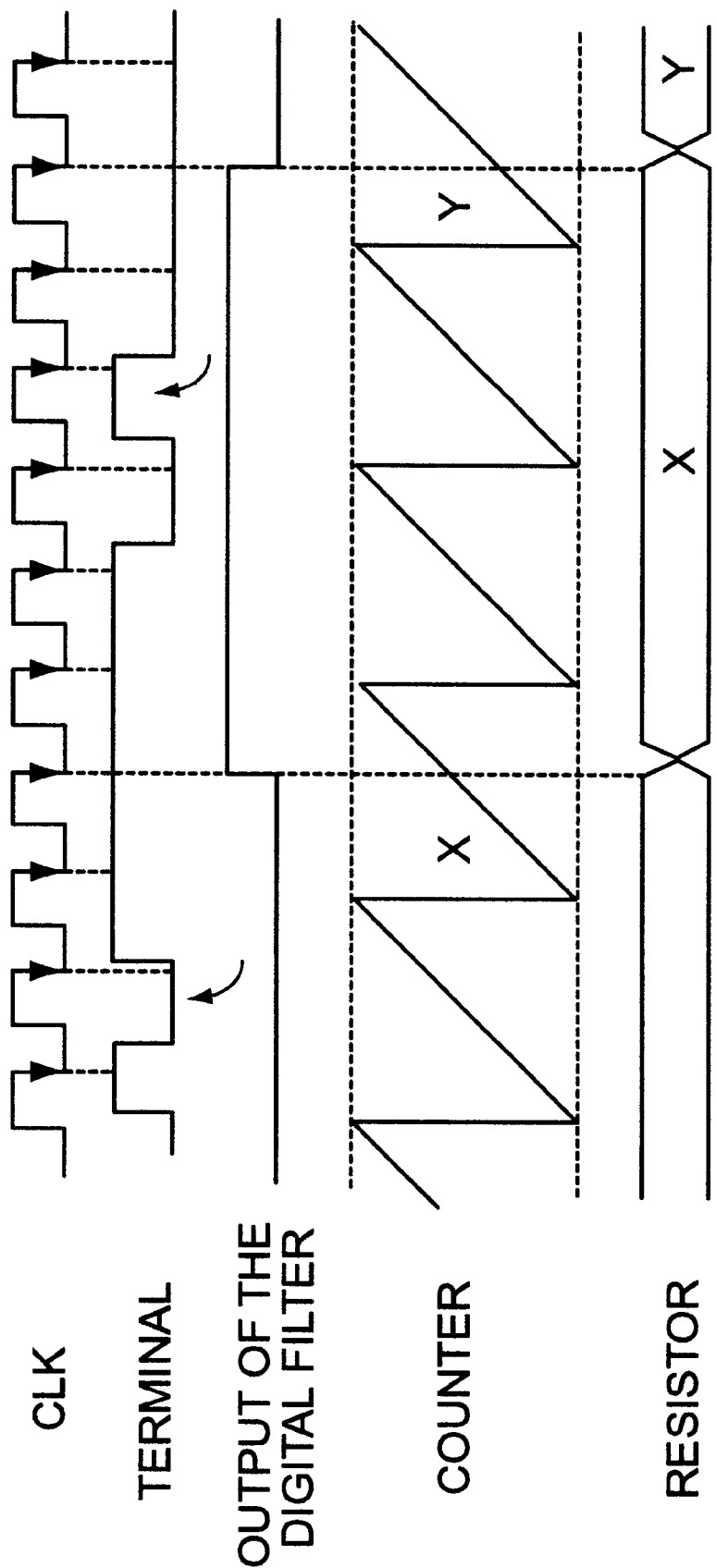
FIG. 4 is a timing chart showing the operation of the data storage control circuit and the peripheral circuits of FIG. 1.

The following is a description of the operation of a capture function for the data storage control circuit 1 and the peripheral circuits of the first embodiment of the above configuration. FIG. 4 is a timing chart illustrating the operation of a capture function employing the data storage control circuit 1 of the first embodiment.

In the clock signal CLK, the H level and L level voltage levels are repeated in a prescribed period. The shift register 21 of the digital filter 14 samples the input signal from the external terminal 13 on each falling edge of the clock signal CLK. In the previous state shown in FIG. 4, the voltage level of the input signal from the external terminal 13 is an L level and the clock signal CLK generates four falling edges. All of the voltage levels of the output signals a to d of each of the flip-flops 21-1 to 21-4 of the shift register 21 are therefore L levels. The voltage level of the output signal of the gate circuit 23 therefore also remains at an L level and the voltage level of the output signal of the sense circuit 15 therefore also remains at an L level. The gate circuit 16 is therefore in a state that prohibits the transfer of the output data of the counter 11 to the register 12 based on the voltage level of the output signal of the sense circuit 15.

It is assumed that just before a time t1, the input signal arrives and the voltage level of the input signal from the external terminal 13 is changed from the L level to an H level. At the time t1, the digital filter 14 samples the input signal from the external terminal 13. The voltage level of the output signal a of the flip-flop 21-1 of the shift register 21 therefore becomes an H level. At this point in time, the voltage levels of the output signals b to d of the other flip-flops 21-2 to 21-4 remain at an L level.

As a result, the voltage levels of the output signals of the AND gates 23-1 to 23-4 of the gate circuit 23 all remain at an L level. As a result, the voltage level of the output signal of the sense circuit 15 remains at an L level.

Noise is generated between the time t1 and a time t2 and the voltage level of the input signal from the external terminal 13 is changed from an H level to an L level. At the time t2, the digital filter 14 samples the input signal from the external terminal 13. As a result, the voltage level of the output signal a of the flip-flop 21-1 of the shift register 21 becomes an L level due to the influence of noise and the voltage level of the output signal b of the flip-flop 21-2 becomes an H level. At this point in time, the voltage levels of the output signals c and d of the other flip-flops 21-3 to 21-4 remain at an L level and the voltage level of the output signal of the sense circuit 15 therefore remains at an L level.

The noise disappears between the time t2 and a time t3 and the voltage level of the input signal from the external terminal 13 changes from an L level to an H level. At the time t3, the digital filter 14 samples the input signal from the external terminal 13. The voltage levels of the output signals a and c of the flip-flops 21-1 and 21-3 of the shift register 21 therefore become H levels and the voltage level of the output signal b of the flip-flop 21-2 becomes an L level. At this time, the voltage level of the output signal d of the flip-flop 21-4 remains at an L level. The voltage level of the output signal of the gate circuit 23 therefore remains at an L level and the voltage level of the output signal of the sense circuit 15 remains at an L level.

After this, at a time t4, the digital filter 14 samples the input signal from the external terminal 13. The voltage levels of the output signals a, b and d of the flip-flops 21-1, 21-2 and 21-4 of the shift register 21 therefore become an H level and the voltage level of the output signal c of the flip-flop 21-3 therefore becomes an L level. As a result, the voltage level of the output signal of the AND gate 23-2 of the gate circuit 23 changes from an level to an H level. In accompaniment with this, the voltage level of the output signal of the OR gate 23-5 that is the output signal of the digital filter 14 also changes from an L level to an H level.

The sense circuit 15 detects the change in the voltage level of the output signal of the digital filter 14 and changes the voltage level of the output signal of the sense circuit 15 from an L level to an H level.

The output signal of the sense circuit 15 is held at an H level for just the time that the output data of the counter 11 can be stored in the register 12 for and becomes an L level thereafter. The gate circuit 16 enters a state where transfer of the output data of the counter 11 to the register 12 is possible in response to changes in the voltage level of the output signal of the sense circuit 15. As a result, output data X of the counter 11 at the point of the time t4 is stored in the register 12.

After this, at time t5, the voltage level of the output signal of the AND gate 23-1 becomes an H level and at a time t6, the voltage levels of the output signals of all of the AND gates 23-1 to 23-4 all become H levels so that the voltage level of the output signal of the digital filter 14 is held at an H level.

Figure 5:
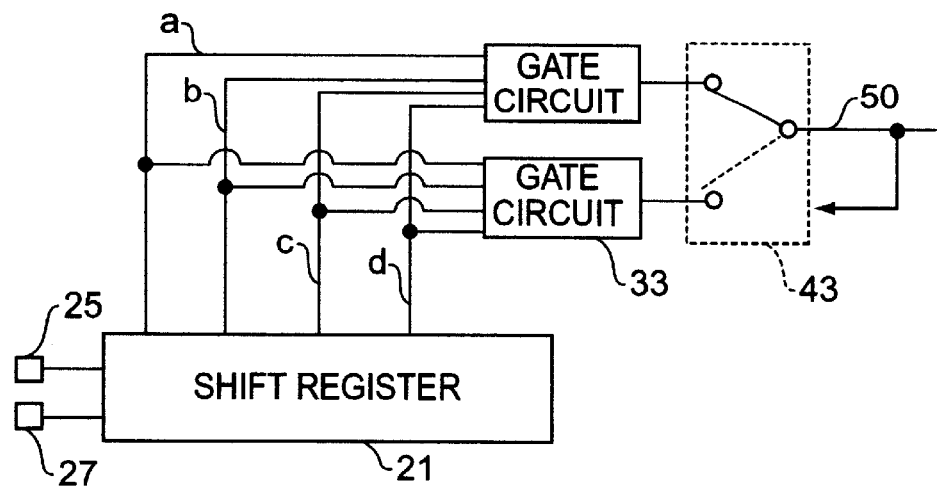
FIG. 5 is a block circuit diagram of the data storage control circuit and the peripheral circuits, showing an improved example of the data storage control circuit of FIG. 1.

A further gate circuit 33 for changing the voltage level of the output signal from an H level to an L level when the voltage levels of at least three of the output signals a to d of the shift registers 21-1 to 21-4 are at L levels can also be provided for the digital filter as shown in FIG. 5. A specific configuration for this gate circuit can be achieved by inputting inverted signals for the output signals a to d of the flip-flops 21-1 to 21-4 to each of the inputs of the AND gates 23-1 to 23-4 of FIG. 3 and making the OR gate 23-5 a NOR gate. The output signal of the digital filter 14 can also be switched over from the output signal of the gate circuit 23 to the output signal of the gate circuit 33 using a switching circuit 43 in accompaniment with the voltage level of the output signal of the digital filter 14 changing from an L level to an H level.

In other words, the switching circuit 43 electrically connects the wiring 50 and the gate circuit 23 when the output signal of the digital filter 14 is an L level and electrically connects the wiring 50 and the gate circuit 33 when the output signal of the digital filter 14 is at an H level. This switching timing is such that wiring 43 and the gate circuit 23 are connected when the voltage level of the output signal of the digital filter 14 is at an L level in an initial state. When the voltage level of the output signal of the digital filter 14 changes from an L level to an H level, it is preferable for a switch to be made to electrically connect the wiring 43 and the gate circuit 33 on the rising edge of the output signal of the digital filter 14. When the voltage level of the output signal of the digital filter 14 changes from an H level to an L level, it is preferable for a switch to be made to connect the wiring 43 and the gate circuit 23 on the falling edge of the output signal of the digital filter 14.

With the configuration shown in FIG. 5, between a time t6 and a time t7 shown in FIG. 4, the voltage level of the input signal from the external terminal 13 changes from an H level to an L level. Between a time t7 and a time t8, the gate circuit 33 does not change the voltage level of the output signal for the digital filter 14 until the voltage level for the input signal is sampled as being an L level at least three times, i.e. until a time t10 as with the aforementioned gate circuit 23 even if noise occurs. At the time t10, the voltage level of the output signal of the digital filter 14 is changed from an H level to an L level. As a result, the voltage level for the output signal of the sense circuit 15 becomes an H level for just a prescribed time. As a result, output data of the counter 11 at the time 10 is stored in the register 12 via the gate circuit 16.

As described in detail above, the desired counter output data can be reliably stored in the register by using the data storage control circuit 1 of the first embodiment without being influenced by noise even is noise occurs in the input signal from the external terminal 13. The timing of the arrival of the input signal from the external terminal can therefore be reliably confirmed.

The data storage control circuit of this embodiment stores the desired counter output data in a register from when the same voltage level is sampled at least three times after changes in the voltage level of the input signal that is the object of monitoring. The timing of storing the desired counter output data in the register is delayed by approximately three or four clock signals from the change in the voltage level of the input signal that is the object of monitoring but this can be easily corrected because the extent of this delay can be estimated in advance. Considering this corrected portion, the timing of the arrival of the input signal can easily be confirmed for an error of approximately one period of the clock signal at maximum.

The data storage control circuit 1 of the first embodiment can be made without requiring a special complex circuit structure and without using special large resistor elements or capacitors. Accordingly, even if this data storage control circuit 1 is used, the surface area occupied by the data storage control circuit 1 is insubstantial for microcomputers and microprocessors. As the number of elements in the circuit structure is kept as small as possible, it is anticipated that the data storage control circuit 1 can be made without increases in costs.

In the above embodiment the shift register 21 is a four bit shift register comprised of four flip-flops but the present invention is by no means limited in this respect and an n-bit shift register comprised of n (where n is a positive integer of three or more) flip-flops is also possible.

The gate circuits 23 and 33 are also by no means limited to changing the voltage level of the output signal when the voltage level of at least 3 bits of the four bit output signal of the shift register 21 are the same level. For example, a gate circuit where the voltage level of the output signal is changed when at least m (where m is a positive integer of two or more and m<n) of the n output signals of the n bit register are the same.

However, changes in the output signal for the data storage control circuit become delayed when n and m are made quite large numerals and if the magnitude of the noise generated is also considered the settings to the extent of this embodiment can be considered to be the most appropriate.

Figure 6:
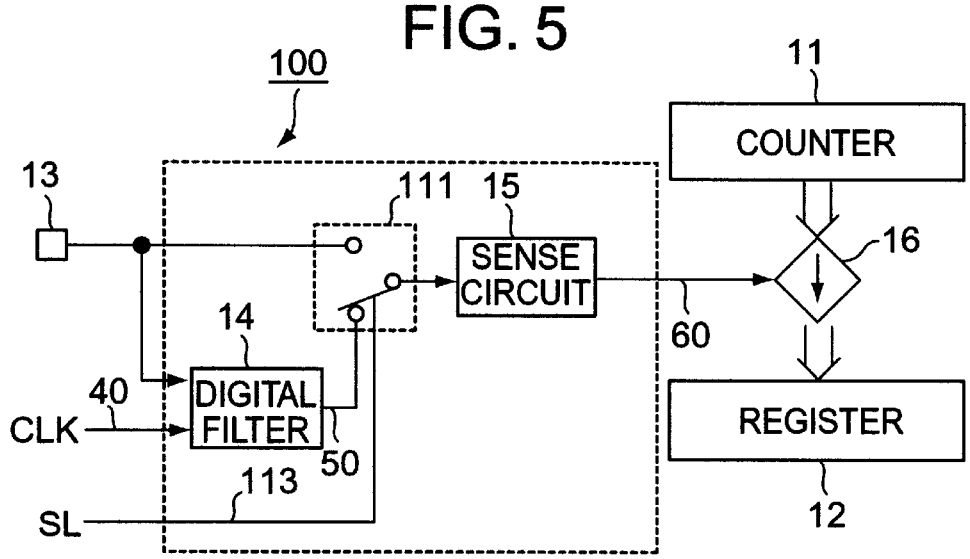
FIG. 6 is a block circuit diagram of a data storage control circuit and peripheral circuits of a second embodiment of the present invention.

The following is a description using the drawings of a data storage control circuit of the second embodiment. FIG. 6 is a block circuit diagram of a data storage control circuit 100 and peripheral circuits constituting a second embodiment of the present invention. In FIG. 6, structural elements that are the same as for FIG. 1 are given the same numerals.

In FIG. 6, a select circuit 111 is provided for the data storage control circuit 100. The select circuit 111 selectively transmits an input signal from the external terminal 13 and a control signal outputted from the digital filter 14 and transmitted by the wiring 50 to the sense circuit 15 in accordance with a select signal SL transmitted via the wiring 113. Other elements of the data storage control circuit 100 and the peripheral circuits are the same as for FIG. 1.

By providing the select circuit 111, in addition to detecting the arrival of the input signal inputted from the external terminal 13 via the digital filter 14, the data storage control circuit 100 can also detect taking the input signal itself as a target at the sense circuit 15 without the input signal passing via the digital filter 14.

The select signal SL used in selection control for the select circuit 111 can be provided with a select flag indicating the necessity of employing the digital filter 14. For example, when the select flag is the binary number "0" (reset state), the voltage level of the select signal becomes an L level and when the select flag is the binary number "1" (set state), the voltage level of the select signal SL becomes an H level. In this case, when the voltage level of the select signal SL is an L level, the select circuit 111 selects the input signal inputted from the external terminal 13 and when the voltage level of the select signal SL is an H level, the select circuit 111 selects the control signal outputted from the digital filter 14 and transmitted via the wiring 50.

For example, there are cases where a microcomputer or a microprocessor with the data storage control circuit 100 built in is used in an environment where it is difficult for noise to influence the input signal from the external terminal 13 or where there is little noise, and cases where a high speed response is required where the influence of the delay from the voltage level of the input signal from the external terminal 13 changing until the output data from the counter 11 is stored in the register 12 due to the digital filter 14 is not desirable. In these kinds of cases, the input signal from the external terminal 13 can be sent directly to the sense circuit 15 using the select circuit 111 by employing the data storage control circuit 100 of the second embodiment. The digital filter 14 can therefore be selectively employed and can easily be utilized in cases where a high speed response is required.

The optimum operating capture function can then be selected for products employing the microcomputers and microprocessors with the data storage control circuit 100 built in in response to input signal conditions and the specifications required of the system (response speed, etc.).

Figure 7:
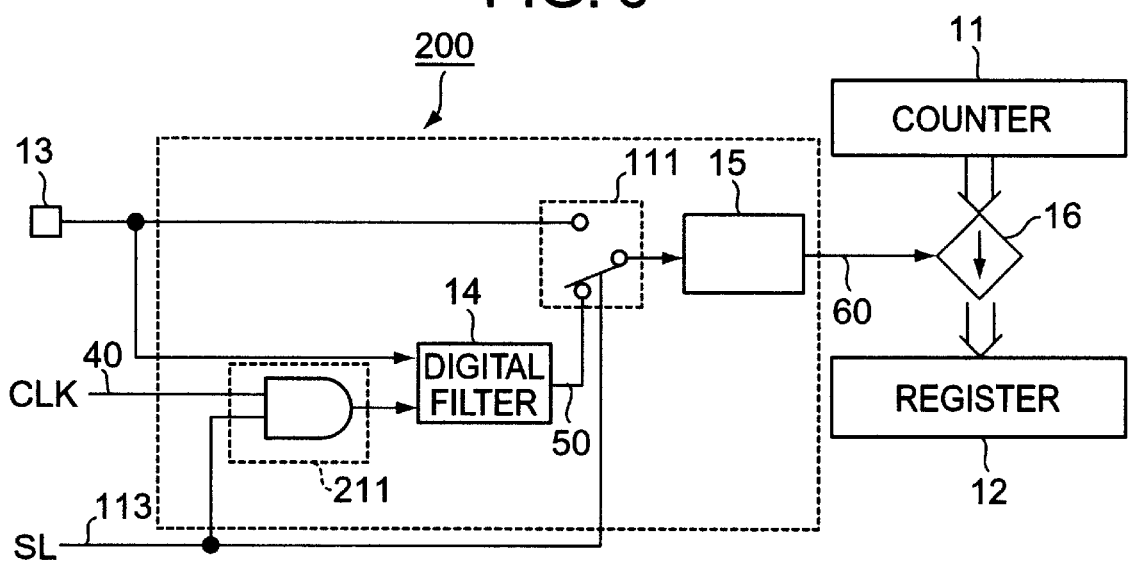
FIG. 7 is a block circuit diagram of the data storage circuit and the peripheral circuits of a third embodiment of the present invention.

Next, a description is given using the drawings of a data storage control circuit of a third embodiment. FIG. 7 is a block diagram of a data storage control circuit 200 and peripheral circuits thereof of the third embodiment of the present invention. Structural elements of FIG. 7 that are the same as those of FIG. 6 are given the same numerals.

In FIG. 7, the data storage control circuit 200 is provided with an AND gate 211 as a clock supply control circuit. Wiring 40 is connected to one input of the AND gate 211 and the clock signal CLK is inputted thereto. Wiring 113 is connected to the other input of the AND gate 211 and the select signal SL is inputted thereto. The output signal of the AND gate 211 is supplied as a clock signal for the sampling of the digital filter 14. Other structural elements and peripheral circuits of the data storage control circuit 200 are the same as for FIG. 6.

As described above, when the voltage level of the select signal SL is an L level, the select circuit 111 selects the input signal inputted from the external terminal 13, and when the voltage level of the select signal SL is an H level, the select circuit 111 selects the control signal outputted from the digital filter 14 and transmitted via the wiring 50. When the voltage level of the select signal SL is an L level, the voltage level of the output signal of the AND gate 211 is fixed at an L level. The operation of the digital filter 14 is therefore in a suspended state. When the voltage level of the select signal SL is an H level, the voltage level of the output signal of the AND gate 211 is responds to the clock signal CLK and the digital filter 14 therefore enters an operating state.

This is to say that when the select circuit 111 is selecting the input signal inputted from the external terminal 13, operation of the digital filter 14 can be halted, and when the select circuit 111 is selecting the control signal outputted from the digital filter 14 and transmitted via the wiring 50, the digital filter can be put into an operating state.

By employing the data storage control circuit 200 of the third embodiment, operation of the digital filter 14 can be put into a suspended state when the digital filter 14 is not yet used by suspending transmission of the clock signal CLK to the digital filter 14. There is therefore no unnecessary operation of the digital filter 14 and consumed current can therefore be reduced accordingly.

Further, the select signal SL for controlling the necessity of using the digital filter 14 is used as the signal for controlling suspension of operation of the digital filter 14 (controlling supply of the clock signal CLK). It is also possible to provide a special signal for controlling suspension of the operation of the digital filter 14 that is separate from the select signal SL so that timing of the select processing due to the select signal SL can be easily controlled. However, control of suspension of the operation of the digital filter 14 with the select signal is preferable because a structure for supplying a new special signal is not required and because this operates so as to work in unison with control of the necessity of employing the digital filter 14.

A description is given above of embodiments of data storage control circuits of the present invention but the configuration of the present invention is by no means limited to the above embodiments.

In the above, the voltage level of the output signal of the gate circuit 23 that is one of the structural elements of the digital filter 14 can also be changed when at least m input signal voltage levels of the n input signals are at an H level. The same can also be said for the gate circuit 33.

The shift register 21 samples on the falling edge of the clock signal CLK but can also sample on the rising edge of the clock signal.

It is also possible to prepare a plurality of clock signals of different period and have the clock signal used for sampling at the digital filter 14 selected in a programmable manner. In this way, applications in products with a wide range of uses are possible and it is possible for the digital filter 14 to sample at the optimum timing by selecting the optimum sampling period in accordance with the conditions of use.

In the third embodiment, an AND gate 211 is provided but the third embodiment can also be realized using an OR gate. In this case, the select circuit 111 can select the input signal from the external terminal 13 when the voltage level of the select signal SL is at an H level. The voltage level of the output signal of the OR gate can then be fixed at an H level by having an H level select signal SL inputted as the input side voltage level so that the operation of the digital filter 14 enters a suspended state.

The data storage control circuit of the present invention is by no means limited to the configurations of the aforementioned embodiments providing the essence of the present invention is not deviated from.

What is claimed is:

1. A data storage control circuit that controls storage of data outputted from a counter circuit to a storage circuit through a gate circuit based on changes in a logic level of an input signal, wherein said gate circuit transfers the data to said storage circuit corresponding to a first logic level of a gate signal and inhibits transfer of the data to said storage circuit corresponding to a second logic level of the gate signal, said data storage control circuit comprising:
   a digital filter that samples the input signal and outputs a control signal for changing a logic level based on the logic level of the input signal sampled a plurality of times; and
   a sense circuit that senses changes in a logic level of the control signal and outputs the gate signal, wherein, when a change in the logic level of the control signal is sensed, said sense circuit outputs the gate signal that has been changed from the second logic level to the first logic level.

2. The data storage control circuit of claim 1, wherein said digital filter samples the voltage level of the input signal upon every transition from a first logic level to a second logic level of sampling clock signal and stores data outputted from the count circuit in the storage circuit when the same logic level is sampled for the input signal m times, wherein m is a positive integer of two or more.

3. The data storage control circuit of claim 2, wherein said digital filter comprises a shift register that stores information for the input signal upon every transition of the sampling clock signal from the first logic level to the second logic level, outputs an output signal of a logic level corresponding to the information, and has n output signals and a control circuit that outputs the control signal, and changes the logic level of the control signal when m of the n output signals of the shift register are of a prescribed logic level, wherein n is a positive integer that is greater than m.

4. The data storage control circuit of claim 1, wherein said data storage control circuit comprises a select circuit that selectively transfers the input signal and the control signal to said sense circuit in response to a select signal, wherein said sense circuit senses changes in the logic level of the input signal and stores data outputted by the counter circuit in said storage circuit when said select circuit selects the input signal.

5. The data storage control circuit of claim 2, wherein said data storage control circuit comprises a select circuit that selectively transfers the input signal and the control signal to said sense circuit in response to a select signal, wherein said sense circuit senses changes in the logic level of the input signal and stores data outputted by said counter circuit in said storage circuit when select circuit selects the input signal.

6. The data storage control circuit of claim 3, wherein said data storage control circuit comprises a select circuit that selectively transfers the input signal and the control signal to said sense circuit in response to a select signal, wherein said sense circuit senses changes in the logic level of the input signal and stores data outputted by said counter circuit in said storage circuit when said select circuit selects the input signal.

7. The data storage control circuit of claim 4, wherein operation of said digital filter is suspended when the select signal is a third logic level as a result of said select circuit selecting the input signal when the select signal is said third logic level and selecting the control signal when the select signal is a fourth logic level.

8. The data storage control circuit of claim 5, wherein operation of said digital filter is suspended when the select signal is a third logic level as a result of said select circuit selecting the input signal when the select signal is said third logic level and selecting the control signal when the select signal is a fourth logic level.

9. The data storage control circuit of claim 6, wherein operation of said digital filter is suspended when the select signal is a third logic level as a result of the select circuit selecting the input signal when the select signal is said third logic level and selecting the control signal when the select signal is a fourth logic level.

10. The data storage control circuit of claim 7, wherein the operation of said digital filter is suspended by suspending supply of the sampling clock signal.

11. The data storage control circuit of claim 8, wherein the operation of said digital filter is suspended by suspending supply of the sampling clock signal.

12. The data storage control circuit of claim 9, wherein the operation of said digital filter is suspended by suspending supply of the sampling clock signal.

13. A data storage control circuit that controls storage of data outputted from a counter circuit to a storage circuit through a gate circuit based on changes in a logic level of an input signal, wherein said circuit transfers the data to said storage circuit corresponding to a first logic level of a gate signal and inhibits transfer of the data to said storage circuit corresponding to a second logic level of the gate signal, said data storage control circuit comprising:

a digital filter that samples the input signal and outputs a control signal for changing a logic level based on the logic level of the input signal sampled a plurality of times; and a sense circuit that senses changes in a logic level of the control signal and outputs the gate signal, wherein, when a change in the logic level of the control signal is sensed, said sense circuit outputs the gate signal that has been changed from the second logic level to the first logic level, wherein said data storage control circuit comprises a select circuit that selectively transfers the input signal and the control signal to said sense circuit in response to a select signal, wherein said sense circuit senses changes in the logic level of the input signal and stores data outputted by the counter circuit in said storage circuit when said select circuit selects the input signal.

14. The data storage control circuit of claim 13, wherein said digital filter samples the voltage level of the input signal upon every transition from a first logic level to a second logic level of sampling clock signal and stores data outputted from the count circuit in the storage circuit when the same logic level is sampled for the input signal m times, wherein m is a positive integer of two or more.

15. The data storage control circuit of claim 14, wherein said digital filter comprises a shift register that stores information for the input signal upon every transition of the sampling clock signal from the first logic level to the second logic level, outputs an output signal of a logic level corresponding to the information, and has n output signals and a control circuit that outputs the control signal, and changes the logic level of the control signal when m of the n output signals of the shift register are of a prescribed logic level, wherein n is a positive integer that is greater than m.

16. The data storage control circuit of claim 14, wherein operation of said digital filter is suspended when the select signal is a third logic level as a result of said select circuit selecting the input signal when the select signal is said third logic level and selecting the control signal when the select signal is a fourth logic level.

17. The data storage control circuit of claim 16, wherein the operation of said digital filter is suspended by suspending supply of the sampling clock signal.

18. The data storage control circuit of claim 13, wherein operation of said digital filter is suspended when the select signal is a third logic level as a result of said select circuit selecting the input signal when the select signal is said third logic level and selecting the control signal when the select signal is a fourth logic level.

19. The data storage control circuit of claim 18, wherein the operation of said digital filter is suspended by suspending supply of the sampling clock signal.

20. The data storage control circuit of claim 15, wherein operation of said digital filter is suspended when the select signal is a third logic level as a result of the select circuit selecting the input signal when the select signal is said third logic level and selecting the control signal when the select signal is a fourth logic level.

21. The data storage control circuit of claim 20, wherein the operation of said digital filter is suspended by suspending supply of the sampling clock signal.

* * * * *